United States Patent [19]

Nakano

[11] Patent Number: 4,499,372

[45] Date of Patent: Feb. 12, 1985

[54] MAIL-ARTICLE TRACING APPARATUS

[75] Inventor: Kazumi Nakano, Tokyo, Japan

[73] Assignee: Nippon Electric Co., Ltd., Tokyo, Japan

[21] Appl. No.: 305,245

[22] Filed: Sep. 24, 1981

[30] Foreign Application Priority Data

Sep. 29, 1980 [JP] Japan .............................. 55-135441
Jul. 29, 1981 [JP] Japan .............................. 56-118833

[51] Int. Cl.³ ............................................. G01V 9/04
[52] U.S. Cl. .................................. 250/223 R; 340/674
[58] Field of Search ................ 250/223 R, 222.1, 209; 271/259, 258; 226/45; 221/21; 340/674; 364/478, 479

[56] References Cited

U.S. PATENT DOCUMENTS

| | | | |
|---|---|---|---|
| 3,046,538 | 7/1962 | Pedersen | 250/223 R |
| 3,488,048 | 1/1970 | Dykaar et al. | 250/223 R |
| 4,268,746 | 5/1981 | Schroeder | 250/223 R |
| 4,275,293 | 6/1981 | Chambors | 250/223 R |
| 4,286,149 | 8/1981 | Ben-Nathan et al. | 250/223 R |

Primary Examiner—David C. Nelms
Attorney, Agent, or Firm—Sughrue, Mion, Zinn, Macpeak & Seas

[57] ABSTRACT

A mail tracing apparatus contains only input and output mail article detectors at the beginning and end of a mail transport path, respectively. By comparing the "on" and "off" times of the detectors at either end of the path, it can be determined, for example, if an initially doubled item has been separated into distinct mail articles, or if a mail article has dropped out of the path during transport.

In either event, an error code is generated in the event of a non sequitur, and the tracing of subsequent mail articles may proceed without error.

9 Claims, 14 Drawing Figures

| | |
|---|---|
| S1 | ON-TIME $t_{a1}$ |
| S2 | OFF-TIME $t_{b1}$ |
| S3 | ON-TIME $t_{a2}$ |
| S4 | OFF-TIME $t_{b2}$ |
| ⋮ | ⋮ |
| S51 | ON-TIME $t_{a26}$ |
| S52 | OFF-TIME $t_{b26}$ |
| S53 | ON-TIME $t_{a27}$ |
| S54 | OFF-TIME $t_{b27}$ |
| ⋮ | ⋮ |

FIG. 6B

| | |
|---|---|
| Y1 | ON-TIME $t_{c1}$ |
| Y2 | OFF-TIME $t_{d1}$ |
| Y3 | ON-TIME $t_{c2}$ |
| Y4 | OFF-TIME $t_{d2}$ |
| ⋮ | ⋮ |
| Y51 | ON-TIME $t_{c26}$ |
| Y52 | OFF-TIME $t_{d26}$ |
| Y53 | ON-TIME $t_{c27}$ |
| Y54 | OFF-TIME $t_{d27}$ |
| ⋮ | ⋮ |

MAIL-ARTICLE TRACING APPARATUS

BACKGROUND OF THE INVENTION

The present invention relates to a mail-article processing apparatus, and more particularly to a mail-article tracing apparatus for use in an automatic mail-handling system.

One example of an automatic mail-handling system requiring a mail-article tracing apparatus is a postal code printing apparatus, in which an address described on a mail-article is picked up by an operator or an optical character reader (OCR), and the postal code corresponding to this address is printed on the same mail-article.

In a prior art mail-article tracing method, plural detectors such as photo-electric detectors are provided along a mail transport path such that there is a predetermined distance between adjacent mail detectors, and plural registers are also provided corresponding to the plural mail detectors, respectively. In this method, a letter is traced by shifting a signal showing a mail-article in the series of registers in response to the detection at the series of the mail detectors. In this case, since the register can store only one signal representing one mail-article, a plurality of mail-articles should not be presented in the transport path corresponding to a section between two adjacent mail detectors. This means that the length of the section should be shorter than the minimum transfer interval of the mail-articles. Therefore, a great number of mail detectors must be provided in a mail-handling system which requires a long transport path. The tracing method just described is referred to as the light bar method hereinafter.

There is another prior art mail-article tracing method reducing the number of the mail detectors in the light bar method, in which a series of several mail detectors are omitted, and a timer circuit is provided to produce a psuedo mail detecting signal. In the timer circuit, the psuedo mail detecting signals are produced in substitution for the mail detection signals delivered from the omitted mail detectors by counting the clock pulses generated in response to the transport speed to a predetermined amount which corresponds to the distance between two adjacent mail detectors in the light bar method. This tracing method is defined as a clock method hereinafter. In the clock method, since the timing of the psuedo mail detecting signal outputted from the timer circuit can be considered equivalent to that of the mail detection signal delivered from the omitted mail detector in the light bar method, the transport speed, for example, the transport belt speed must be kept equal to the actual mail transport speed. However, the actual mail transport speed is in practice because of the slippage between the mail-article and a transport path, and this variation in the actual mail transport speed results in a timing error between the psuedo mail detecting signal and the time when the mail-article arrives at the point of the omitted mail detector. With increasing omitted mail detectors, this timing error is extended. Consequently, a mis-tracing operation occurs when the timing error exceeds the transport time corresponding to the distance of one section, i.e., the distance between two adjacent mail detectors in the light bar method. Since the number of mail detectors which can be omitted is limited to several in practice, it is not possible to reduce the system hardware, such as mail detectors, remarkably.

SUMMARY OF THE INVENTION

Therefore, an object of the present invention is to provide a mail-article tracing apparatus which includes only two mail detectors, provided at the entrance and the exit of the transport path.

According to the present invention, there is provided a mail-article tracing apparatus which comprises two mail detectors provided at an entrance and an exit of a transport path, means for producing order codes representing transport orders at the entrance and the exit, respectively, means for measuring transport intervals between two adjacent transported mail-articles at the entrance and the exit, respectively, memory means for storing data expressing the transport intervals as addressed by the order codes at the entrance and the exit of the transport path, respectively, and means for comparing the transport interval data at the entrance of transport path read out from the memory means with that at the exit of transport path. When the transport intervals at the entrance and the exit are substantially equal or within a predetermined allowance, the transport order code produced at the exit of the transport path is outputted as it is. When the transport interval at the exit is shorter than that at the entrance beyond the allowance, the transport order code produced at the exit is shifted to decrease by one and a reject code is assigned to the mail-articles which shorten the transport interval. When the transport interval at the exit is more extended than that at the entrance beyond the allowance, the transport order code produced at the exit is shifted to increase by one.

DESCRIPTION OF THE PREFERRED EMBODIMENTS

Figure 1:
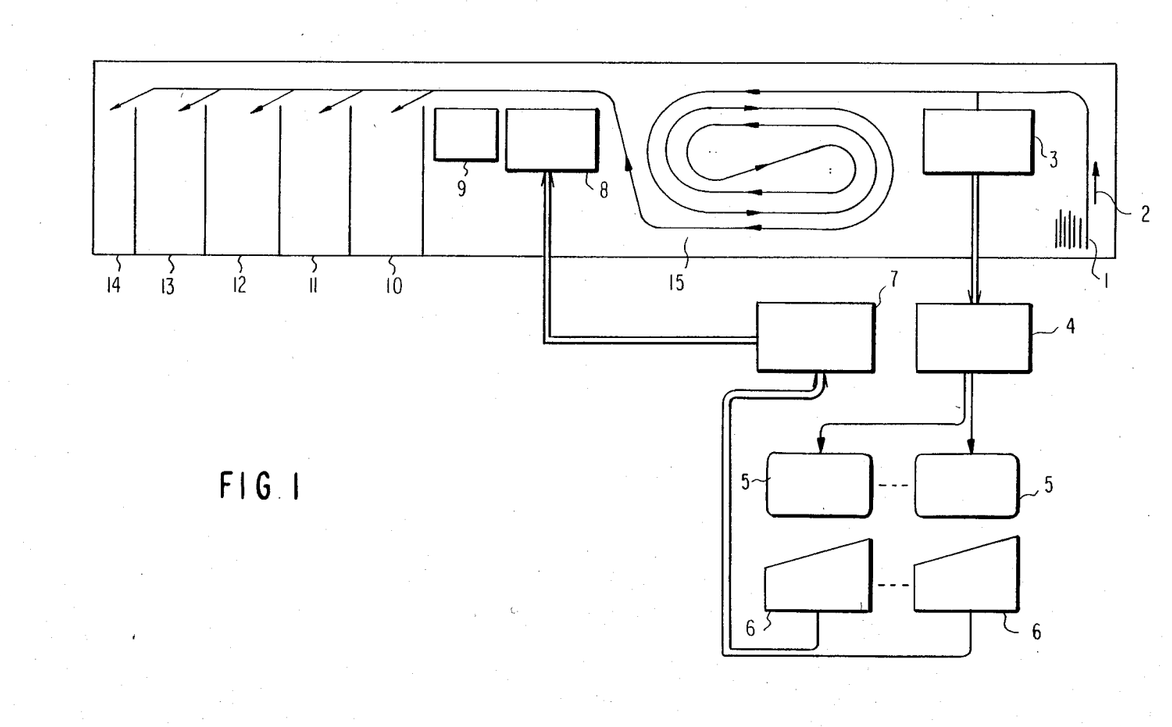
FIG. 1 shows a schematic block diagram of a postal code printing apparatus to which the present invention is applicable.

The description of a mail-article tracing apparatus according to the present invention, a postal code printing apparatus to which the present invention is applicable will first be described to show the advantage of the invention. In FIG. 1, mail-articles 1 are fed from a feeder section one by one and transported in the direction of an arrow 2. An address written on the mail-article is picked up by a scanner 3, for example, a video camera, and the picked-up image signal from the scanner 3 is distributed to display units 5 through a memory unit 4. An operator reads the displayed address image on the display unit 5 and designates a postal code corresponding to the respective address into a keyboard 6. The postal code keyed by the keyboard 6 is passed through a signal processing unit 7 to a printer 8. The printer 8 prints a code mark, for example, a bar code corresponding to the postal code on the mail-article when it reaches a position in front of the printer 8. The code mark is read by a code reader 9 and the mail-article is sorted into one of stackers 10 to 14 in response to the read code mark.

In FIG. 1, the keying operation for the transported mail-article should be completed before it reaches the printer 8. This necessitates the delay time from a time that the mail-article passes the scanner 3 to the time that it reaches the printer 8. In other words, a long transport path 15 should be provided to cause the delay time. Therefore, a mail tracing operation between the scanner 3 and the printer 8 is necessary to prevent a mis-printing of the code mark.

Figure 2:
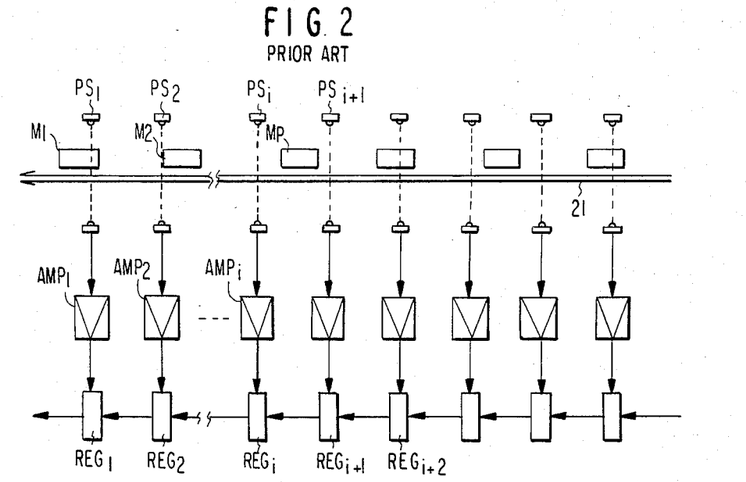
FIG. 2 shows a schematic block diagram of a prior art mail-article tracing apparatus according to the light bar method.

Turning now to FIG. 2, there is shown an arrangement of the light bar method which is one of the conventional tracing methods. As shown, a series of mail detectors $PS_i$ (i=1, 2, 3) are disposed in association with amplifiers $AMP_i$ and registers $REG_i$, respectively. A series of mail-articles $M_p$ (p=1, 2, 3 ..., but does not correspond to i) is transported by a transport path 21. In the course of transportation, the mail detector $PS_i$ produces an ON signal when the mail-article $M_p$ passes the mail detector $PS_i$ and the amplifier $AMP_i$ produces a timing signal $TS_i$. The timing signal $TS_i$ drives the register $REG_i$ to shift a signal $C_p$ corresponding to the mail-article $M_p$ from the register $REG_{i-1}$ to the register $REG_i$. Thus, the signal $C_p$ of the mail-article $M_p$ is successively shifted through the series of registers $REG_i$ from upstream to downstream as the mail-article $M_p$ passes the series of mail detectors $PS_i$ in the same direction. In this way, the mail-article is traced. If the interval between the adjacent mail detectors $PS_{i-1}$ and $PS_i$ is longer than the interval between the successive mail-articles $M_{p-1}$ and $M_p$, the signal $C_p$ relating to two mail-articles is loaded into one register $REG_i$. As a result, the mail-article $M_{pi-1}$ can not be discriminated from the mail-article $Mp_i$ and hence the tracing of the mail-article is impossible. It is for this reason that the interval between the mail detector $PS_i$ provided must not be shorter than the minimal transfer distance between the mail-articles.

Figure 3:
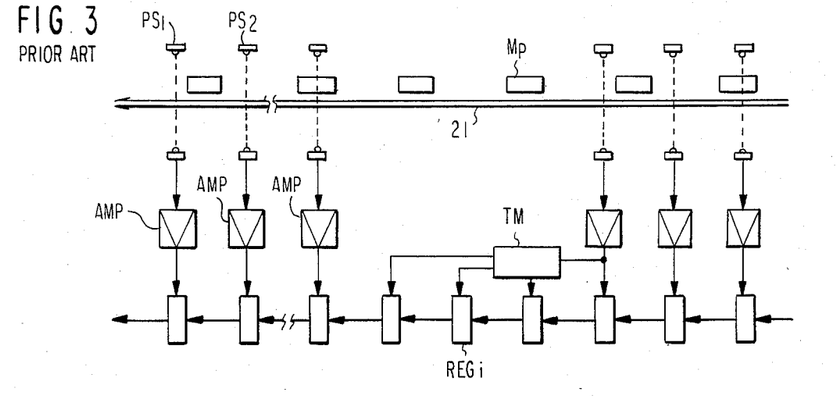
FIG. 3 shows a schematic block diagram of another prior art mail-article tracing apparatus according to a clock method.

FIG. 3 shows an arrangement of the clock method which is the second noted conventional tracing method. In FIG. 3, three mail detectors PS are omitted from light bar tracing system shown in FIG. 2. In the drawing, a timer circuit TM is driven by clocks corresponding to the transport speed to produce timing signals $TS_i$ as if the three mail detectors omitted are actually provided. Therefore, the operation of the tracing system using the present clock method is the same as that using the light bar method shown in FIG. 1. Through the registers $REG_i$, the signal $C_p$ representing the mail-article is successively shifted following the flow of the mail-article $M_p$, with the result that the mail-article $M_p$ is traced successively.

Figure 4:
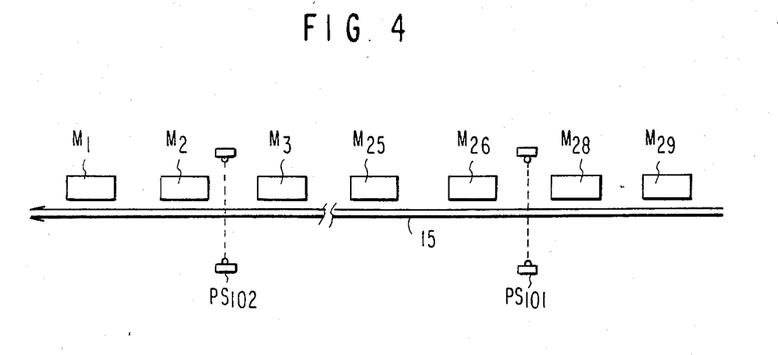
FIG. 4 schematically shows a transport path and two mail detectors of the present invention.

The present invention will be described in detail with reference to the accompanying drawings. In FIG. 4 for illustrating the principle of the present invention, along the transport path 15, there are disposed only two mail detectors $PS_{101}$ and $PS_{102}$, which are provided at the entrance and exit of the transport path, respectively, separated by a distance of, for example, about 24 mail-articles arranged in end to end manner.

Figure 5A:
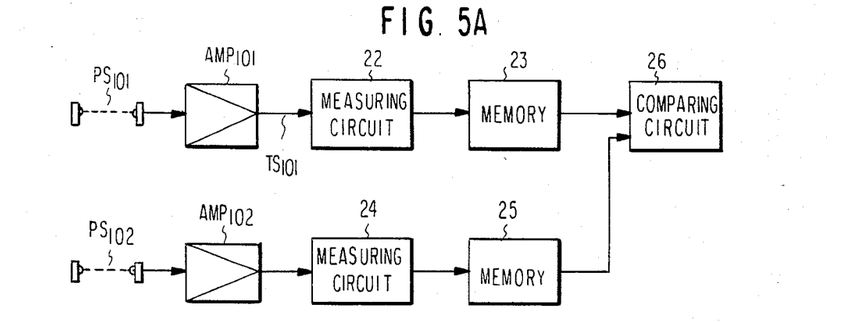
FIG. 5A shows a block diagram of an embodiment according to the present invention.

FIG. 5A shows an embodiment of a mail-article tracing apparatus according to the present invention. In the figure, signals from the two detectors $PS_{101}$ and $PS_{102}$ are wave-shaped by amplifiers $AMP_{101}$ and $AMP_{102}$ and then applied to measuring circuits 22 and 24, respectively. The measuring circuits 22 and 24 are each comprised of a counter for generating a transport order code (a transport number) j representing a transport order every time it detects a mail-article, a counter for measuring an ON time corresponding to the length of the mail-article, and another counter for measuring an OFF time corresponding to a transport interval between two mail-articles. In order to measure the ON and OFF times, an output signal from the AMP is sampled and checked to see whether the signal level of the output signal from the AMP is high or low, at a very high frequency rate. Therefore, by sensing the change of the signal level, i.e., low to high and high to low, the leading and trailing edges of the mail-article are detected, and by counting sample points the high and low signal levels, the ON and OFF times are detected. This process is easily performed by a computer technique.

In the memory circuits 23 and 25, addresses corresponding to the transporting numbers j are designated and the ON time and the OFF time are successively stored in the memory areas defined by the addresses, respectively. The memory circuit 23 successively stores the ON time $t_{aj}$ and the OFF time $t_{bj}$ at the entrance (at the position of the detector $PS_{101}$) of the transport path 15. The memory circuit 25 successively stores the ON time $t_{cj}$ and the OFF time $t_{dj}$ at the exit (the position of the detector $PS_{102}$) of the transport path 15.

Figure 6A:
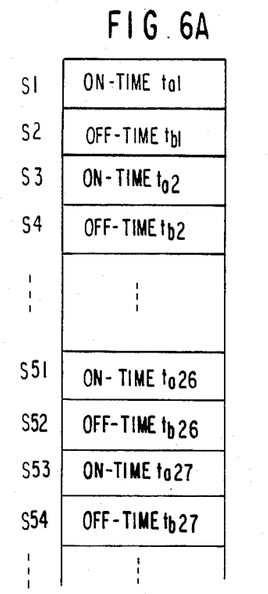
FIGS. 6A and 6B diagrammatically illustrate the contents of memory circuits used in the circuit shown in FIG. 5A.
Figure 6B:
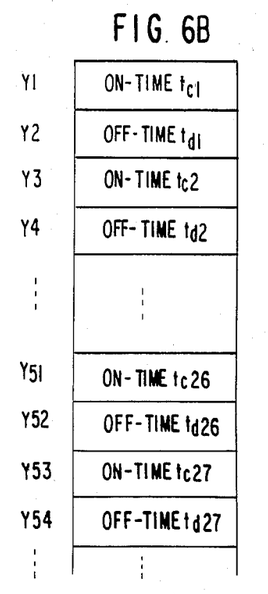

In FIGS. 6A and 6B illustrating the contents of the memory circuits 23 and 25, S1, S2, S3, ... in FIG. 6A and Y1, Y2, Y3, ... in FIG. 6B indicate respectively address numbers in the memory circuits 23 and 25, and are allotted to the transport numbers j two for one; pairs of S1 and S2, and Y1 and Y2 are allotted to j=1.

When a series of the mail-articles $M_j(M_1, M_2, ...)$ are transported along the transport path 15, an output signal $TS_{101}$ is produced from the amplifier $AMP_{101}$ every time a mail-article $M_j$ passes the mail detector $PS_{101}$. Through the measuring circuit 22, the ON time $t_{aj}$ and the OFF time $t_{bj}$ are successively stored in the memory circuit 23. Then, when the mail-articles $M_j$ are transported on the transport path 15 and pass the mail detector $PS_{102}$, an output signal $TS_{102}$ is produced from the amplifier $AMP_{102}$ and through the measuring circuit 24, the ON time $t_{cj}$ and the OFF time $T_{dj}$ are successively stored in the memory circuit 25.

Every time an OFF time $t_{dj}$ is stored in the memory circuit 25, the comparator 26 successively compares the OFF time $t_{bj}$ at the entrance with the OFF time $t_{dj}$ at the exit. If the result of the comparison shows no abnormality, i.e., the OFF time $t_{bj}$ is nearly equal to the OFF time $t_{dj}$, the transport number j is successively applied to the mail-article $M_j$ passing the mail detector $PS_{102}$. The state where the OFF time $t_{dj}$ at the exit is shorter than the OFF time $t_{bj}$ at the entrance indicates that a doubled mail-article has been separated into individual mail-articles during transportation. In this case, the transport number is changed to the preceding number j−1 at the exit, so as to prevent an error from occuring in the succeeding mail-article. In this case, a reject code is applied to the two mail-articles doubled at the entrance of the transport path. The state where the OFF time $t_{dj}$ is longer than the ON time $t_{bj}$ indicates that a mail-article has dropped out during transport. In this case, the transportation number is changed to j+1 so as to eliminate the error in the next mail-articles. In this way, mail-articles are traced correctly.

Figure 5B:
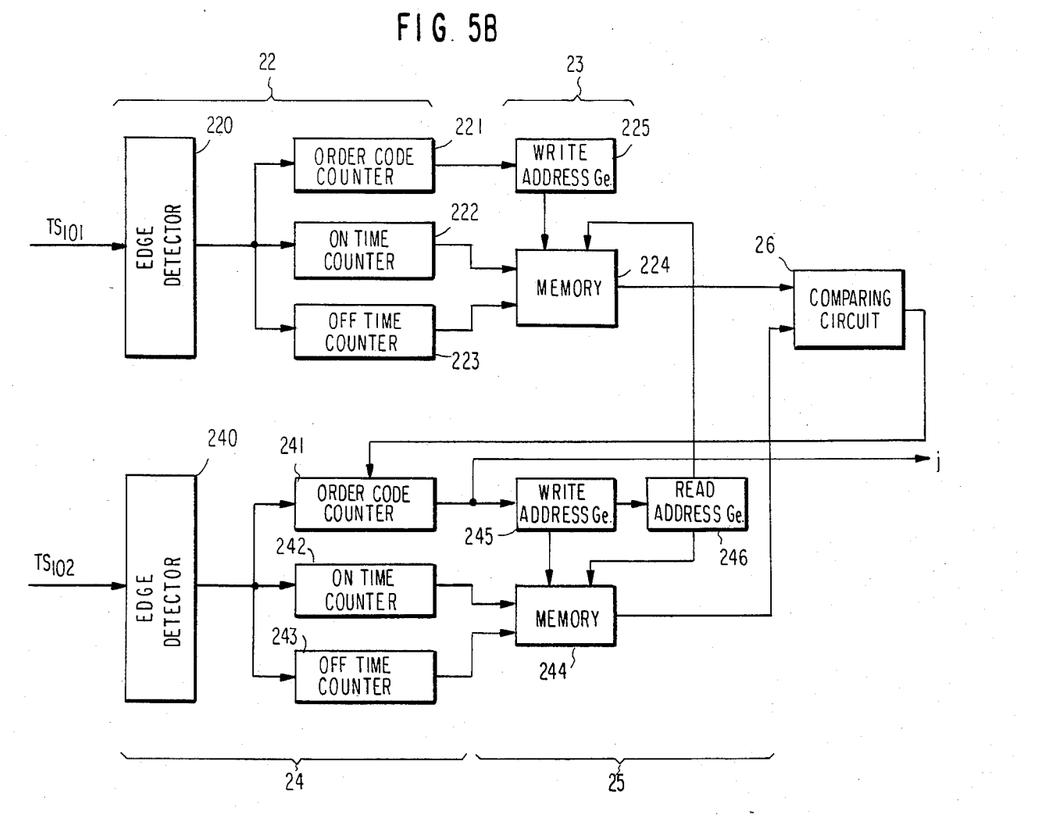
FIG. 5B shows a block diagram of the details of respective portions in the circuit shown in FIG. 5A.

FIG. 5B shows a circuit diagram including the measuring circuits 22 and 24, the memory circuits 23 and 25, and the comparing circuit 26. The measuring circuit 22 is comprised of an edge detector 220 for detecting leading and trailing edges, a transport number counter 221 for counting every time a mail-article is transferred, and an ON time counter 222 and an OFF time counter 223 for measuring the ON time and OFF time in response to the output signal from the edge detector 120. The memory circuit 23 is comprised of a memory 224 for storing the ON times and OFF times, and a write address generating circuit 225 for forming a write address of the memory 224 on the basis of the output signal from the transport number counter 221. The measuring circuit 24, like the measuring circuit 23, is comprised of an edge detector 240, a transport number counter 241, an ON time counter 242 and an OFF time counter 243. The memory circuit 25 is constructed of a memory 244 for storing the ON times and OFF times, a write address generating circuit 245, and a read address generating circuit 246 for generating read addresses for the memories 224 and 244. The read address generating circuit 246 generates the address slightly delayed so as not to simultaneously designate the read address and the write address in the memory 244. The delay time is extremely short. The comparing circuit 26, as described above, compares the OFF times read out from the memories 224 and 244. When an abnormality is found in article transportation as the result of the comparison, the comparing circuit 26 serves to correct the output signal from the transport number counter 241.

In the postal code printing apparatus shown in FIG. 1 incorporating the present invention, a sorting code keyed by an operator is stored linked to the transport code (transport number) determined at the entrance of the transport path 15. The stored sorting code is read out by the transport number produced at the exit of the transport path 15, and the code mark corresponding to this sorting code is printed by printer 12.

When there is an abnormality in doubled transportation, particularly when the mail-articles are separated into individual ones during the transportation, the sorting code read out by the transport number at the exit is not used, but a reject code is assigned in place of the sorting code. In this embodiment, no tracing means, such as mail detectors, are provided between the entrance and the exit of the path 15. Therefore, the transport mail-article tracing apparatus may be extremely simplified in construction.

Figure 7:
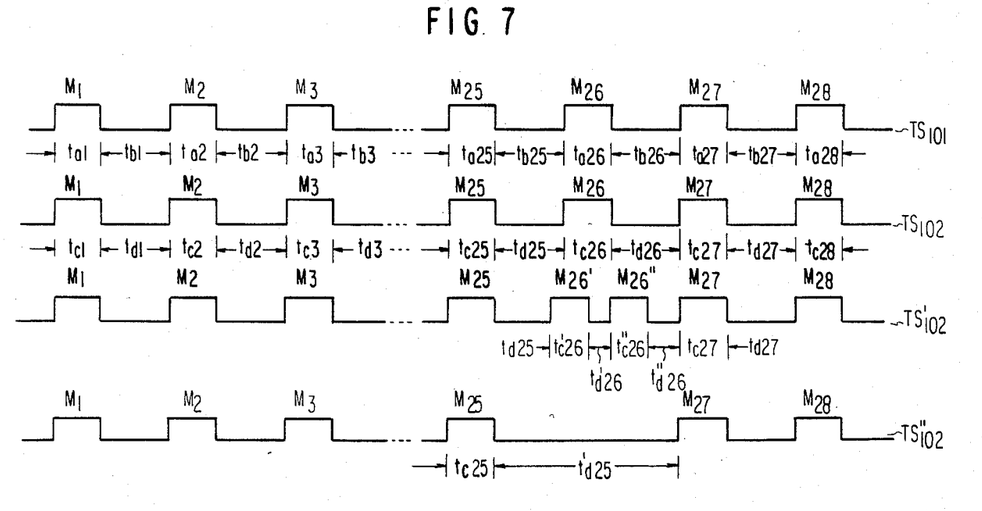
FIG. 7 shows a timing chart of output signals from mail detectors $PS_{101}$ and $PS_{102}$ used in FIGS. 4 and 5.

FIG. 7, which is useful in explaining the operation of the present invention, illustrates relationships between the ON times $t_{aj}$ and $t_{cj}$ and the OFF times $t_{bj}$ and $t_{dj}$. In the figure, the waveforms $TS_{101}$ and $TS_{102}$ correspond to the mail detectors $PS_{101}$ and $PS_{102}$, respectively. When a mail-article $M_j$ is normally transported between the mail detectors $PS_{101}$ and $PS_{102}$, the signal produced signal has the waveform $TS_{102}$. In this case, the waveform $TS_{102}$ is delayed behind the waveform $TS_{101}$ by the transport time corresponding to a time duration between the mail detectors $PS_{101}$ and $PS_{102}$. For those waveforms, the ON times $t_{aj}$ and $t_{cj}$ and OFF times $t_{bj}$ and $t_{dj}$ remain unchanged.

Figure 8A:
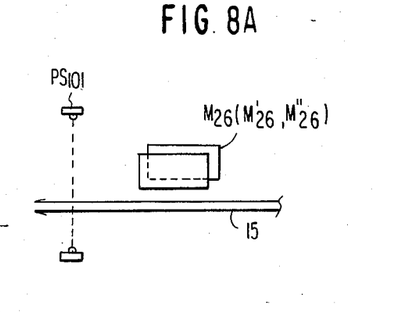
FIGS. 8A and 8B show schematic diagrams for explaining the operation of the present invention, in which mail-articles being transported with overlap and thence separated are illustrated.
Figure 8B:
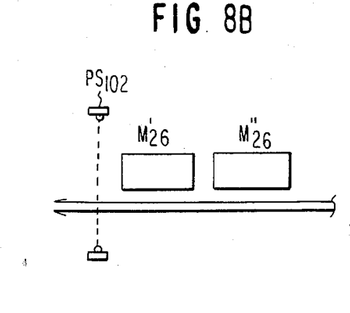

Let us consider the case where a mail-article $M_j$ transported as indicated by $TS_{101}$ has an abnormality during transportation. In FIG. 7, waveforms $TS'_{102}$ and $TS''_{102}$ are the signals output when an abnormality occurs in the transport path between the mail detectors $PS_{101}$ and $PS_{102}$. In the case indicated by the waveform $TS'_{102}$, the mail-article mass $M_{26}$ composed of two mail-articles in an overlapped manner as shown in FIG. 8A has been transported by the point of the mail detector $PS_{101}$ and later separated into two individual mail-articles $M'_{26}$ and $M''_{26}$ during transportation, as shown in FIG. 8B. Accordingly, the mail detector $PS_{102}$ detects two individual mail-articles $M'_{26}$ and $M''_{26}$. In the case of the waveform $TS''_{102}$, the mail-article $M_{26}$ has deviated from the transport path by some reason after passing the mail detector $PS_{101}$ but before passing the mail detector $PS_{102}$, and has failed to pass the mail detector $PS_{102}$.

Let us compare the waveform $TS_{102}$ in the normal transportation situation with the waveforms $TS'_{102}$ or $TS''_{102}$ of the abnormal transportation situation. In comparison to the OFF time $t_{d'26}$ of the article $M'_{26}$ when the overlapped mail-article mass $M_{26}$ is separated into two individual mail-articles, the following relation is true for the OFF time $t_{d26}$ when the mail-article $M_{26}$ is normal.

$$t_{d26} \cong t'_{d26} + t''_{c26} + t''_{d26} \tag{1}$$

Where $t''_{c26}$ and $t''_{d26}$ are the ON time and the OFF time of the mail-article $M''_{26}$, respectively. Therefore, since $$t_{d26} > t'_{d26} + t''_{c26} \tag{2}$$

the OFF time $t'_{d26}$ of the mail-article $M_{26}$ is at least shorter than the OFF time $t_{d26}$ of the mail-article $M_{26}$ by at least the ON time $t''_{c26}$ of the mail-article $M''_{26}$ or more.

The case where a mail-article deviates from the transport path will now be described. In comparison to the OFF time $t'_{d25}$ of the mail-article $M_{25}$ when the mail-article $M_{26}$ deviates from the transport path, the OFF time $t_{d25}$ of the mail-article $M_{25}$ when the mail-article $M_{26}$ is normally transported is as follows.

$$t'_{d25} \cong t_{d25} + t_{c26} + t_{d26} \tag{3}$$

Accordingly, the following relation is obtained.

$$t'_{d25} > 2 \times t_{d25} \tag{4}$$

As described above, by using equations (2) and (4), the normality or abnormality of article transportation, i.e., the separation of the mail-articles or the deviation of a mail-article, can be discriminated. As seen from FIG. 7, when an abnormality occurs, the change in the OFF time $t'_{dj}$ is either about $\frac{1}{2}$ or two times the OFF time $t_{dj}$ of normal transportation. Therefore, any abnormality can be easily discovered.

The speed system variation in a practical transport speed is small and less than ±10%. This value indicates that the ON times $t_{cj}$ and OFF times $t_{dj}$ measured at the point of the mail detector $PS_{102}$ may vary ±20% at maximum from the ON times $t_{aj}$ and OFF times $t_{bj}$ measured at the point of the mail detector $PS_{101}$. Since the maximum normal time variation of 20% is quite small when compared to the time variation of $\frac{1}{2}$ or 2 times when an abnormality in mail-article transportation occurs, the discrimination as to whether an abnormality has occured can be reliably carried out.

Figure 9A:
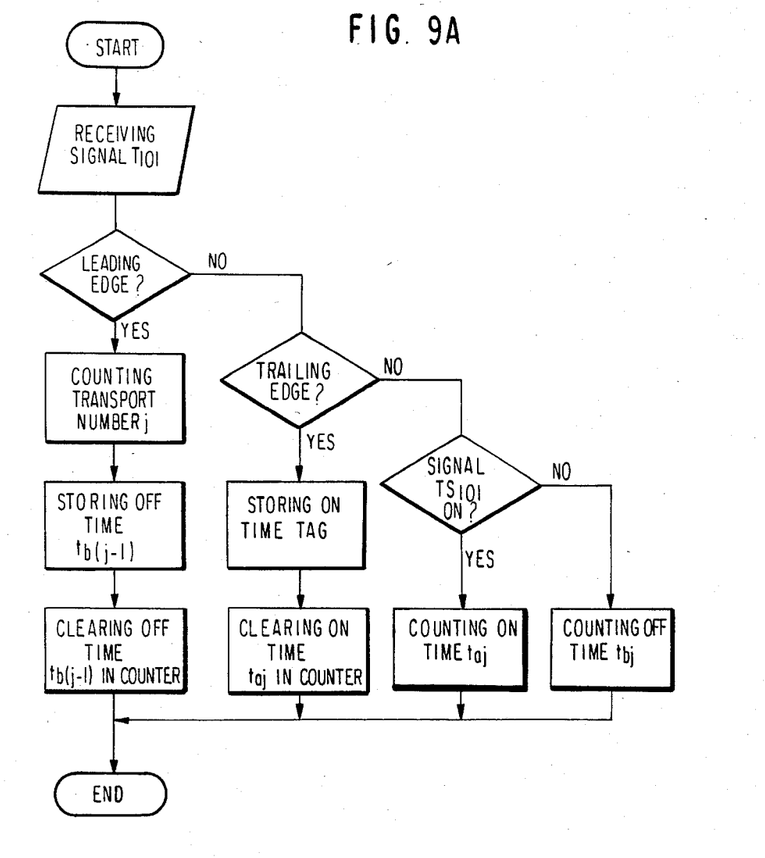
FIGS. 9A and 9B are flowcharts for illustrating operation flows of the tracing apparatus of the present invention.
Figure 9B:
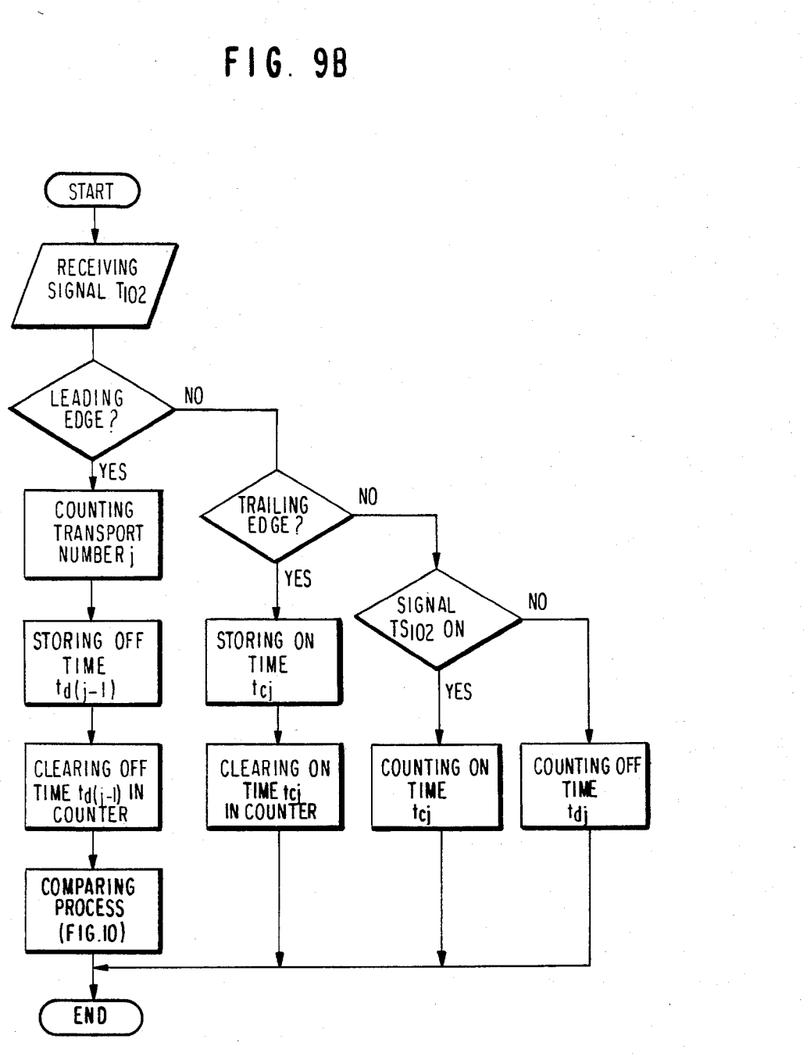

Turning now to FIGS. 9A and 9B, there are shown flow diagrams of an embodiment of the present invention, where the process corresponding to FIGS. 5A and 5B is performed by a computer technique. In FIG. 9A, when the output signal $TS_{101}$ from the mail detector $PS_{101}$ is checked and indicates the detection of a leading edge, the transport number j of the passed transport mail-article $M_j$ is counted. The OFF time $t_{bj-1}$ is measured and is stored in the memory circuit 23 at an address S x (S x indicates address numbers 2, 4, 6, . . . , 2j, . . . in the memory circuit) corresponding to the transport number j, to thereby clear the measured OFF time $t_{bj}$. When the output signal $TS_{101}$ indicates the trailing edge, the ON time $t_{aj}$ is stored at the address Y x (1, 3, 5, . . . , (2j−1), . . . ) in the memory circuit 23 corresponding to the transportation number j counted in the case of the leading edge, to thereby clear the measured ON time $t_{aj}$. When the output signal $TS_{101}$ is in an ON state (high level), the ON time $t_{aj}$ is counted. When the output signal $TS_{101}$ is in an OFF state (low level), the OFF time $t_{bj}$ is counted. The procedure diagrammed in FIG. 9A is cyclicly repeated at very high frequency.

In FIG. 9B the state of the output signal $TS_{102}$ of the mail detector $PS_{102}$ is also checked. Then, like the output signal $TS_{101}$, the ON time $t_{cj}$ and OFF time $t_{dj}$ are counted and stored in the memory circuit 25. When the output signal $TS_{102}$ indicates a leading edge, a comparison is performed in addition to the above processing, so that the transport numbers j are successively allotted to the transported mail-articles $M_j$ passing the mail detector $PS_{102}$. The comparison process will further be described referring to FIG. 10, which illustrates the details of the comparison process. The comparator compares the OFF time $t_{bj}$ and the OFF time $t_{dj}$ which are stored in the addresses S x and Y x of the memory circuits, corresponding to the transport number j.

Figure 10:
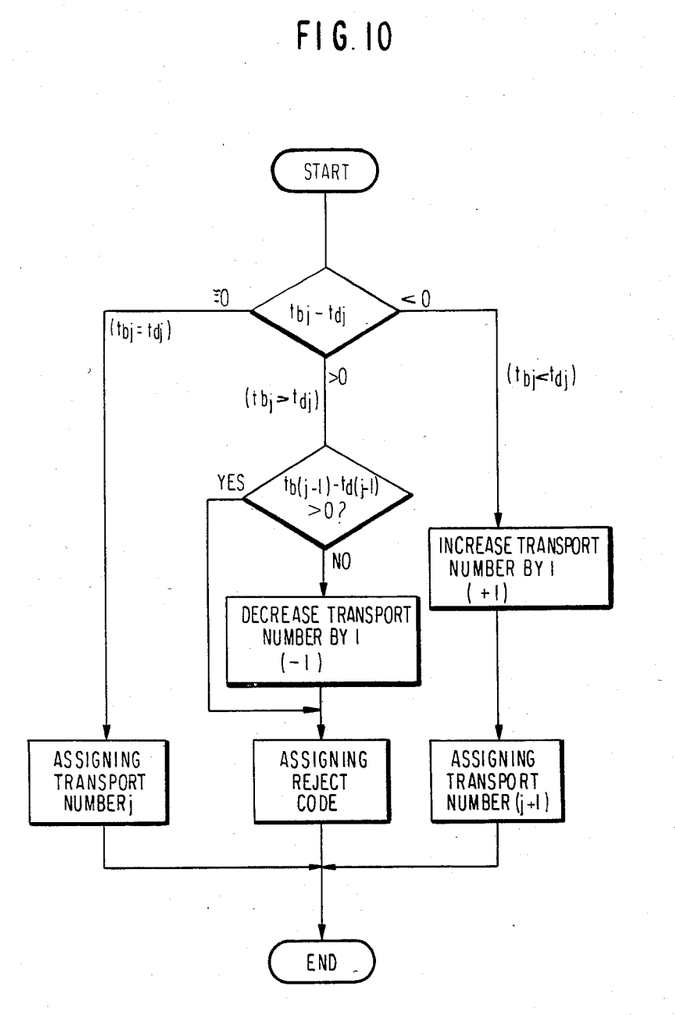
FIG. 10 is a flowchart for illustrating a comparing process according to the present invention.

When the result of the comparison shows that those OFF times substantially equal each other, it is determined that the transport article $M_j$ has been normally transported through the transport path 15 between the mail detectors $PS_{101}$ and $PS_{102}$. Therefore, the transport number j is allotted to the transport article $M_j$ at the exit of the transport path.

When the result of the comparison shows that the OFF times are not substantially equal to each other, it is judged that there is an abnormality in the transported mail-article $M_j$. In the situation where $t_{bj} > t_{dj}$, it is judged that two overlapped mail-articles at the entrance of the transport path have been separated into two individual ones during transportation along the path 15. Conversely, in the situation where $t_{bj} < t_{dj}$, it is judged that the mail-article transported through the path 15 has deviated from the transport path 15. Therefore, in order to correctly trace the mail-article even under the occurrence of abnormalities, when the comparison result shows $t_{bj} > t_{dj}$, the transport number at the photoelectric switch $PS_{102}$ is increased by one, the transport number j is set to −1 once and the reject code is allotted to the mail-articles separated into two individual ones. When $t_{bj} < t_{dj}$, the transport number is increased by one and the increased transport number is allotted to the mail-article at the mail detector $PS_{102}$.

To detect the transporting condition, the OFF time was used in the above description. The ON time stored simultaneously with the OFF time is used for detecting a jam or the like in such a way that when the ON time is sufficiently long, it is judged that a jam has occured. In practice, the memories for storing the ON and OFF times are designed so as to be cleared at a predetermined timing. For example, with a memory circuit capable of storing data on 200 mail-items, after 200 mail articles are continuously conveyed, the transportation of the mail-articles is stopped for a short period and the memories, the comparing circuit, and the like are cleared in this short period. If a double memory method is used for the memory circuits 23 and 26, such interruption of the mail transportation is not necessary. This may be achieved by storing the ON and OFF times into two individual memories, alternatively, after 200 mail-articles are transported.

As described above, the mail-article tracing apparatus of the present invention can monitor mail transportation on a long transport path without a great number of mail detectors and any without restriction of the relation between assignment of mail detectors and mail interval.

What is claimed is:

1. A mail-article tracing apparatus comprising:
   first and second mail detectors provided at an entrance and an exit of a transport path, respectively, for detecting mail-articles transported on the transport path, the distance between said first and second mail detectors corresponding to the length of plural mail-articles;
   first and second measuring means for measuring intervals between two adjacent transported mail-articles at the entrance and exit of the transport path, respectively, in response to the outputs of said first and second mail detectors, said first and second measuring means delivering data expressing said intervals;
   first and second memory means for storing said data expressing the intervals measured by said first and second measuring means, respectively;
   means for comparing the data delivered from said first and second memory means; and
   abnormality detecting means for detecting an abnormality in mail-article transportation on the transport path when the data delivered from said first and second memory means are substantially different.

2. An article tracing apparatus comprising:
   first and second detectors provided at an entrance and an exit of a transport path, respectively, for detecting articles transported on the transport path, the distance between said first and second mail detectors corresponding to the length of plural mail-articles;
   first and second measuring means for measuring intervals between two adjacent transported articles at the entrance and exit of the transport path, respectively, in response to the outputs of said first and second detectors, said first and second measuring means delivering data expressing said intervals;

first and second means for producing order codes representing transport orders at the entrance and exit of the transport path, respectively;

first and second memory means for respectively storing said data expressing the intervals measured by said first and second measuring means at such addresses that correspond to the order codes outputted from said first and second order code producing means respectively;

means for comparing data read-out from said first and second memory means at the addresses corresponding to the order codes outputted from said second order code producing means; and order code modifying means coupled to said order second order code producing means, and responsive to said comparing means, for modifying the order code.

3. A tracing apparatus as claimed in claim 1, wherein said first and second measuring means each comprise first counter means for measuring a first time corresponding to the length of an article, and second counter means for measuring a second time corresponding to the interval between adjacent articles.

4. A tracing apparatus as claimed in claim 2, wherein said first and second measuring means each comprise first counter means for measuring a first time corresponding to the length of an article, and second counter means for measuring a second time corresponding to the interval between adjacent articles, and third counter means for generating transport order codes comprising transport numbers upon detection of a leading edge of an article.

5. A tracing apparatus as claimed in claim 3, wherein said first and second memory means store said first and second times measured by said counters in said first and second measuring means, respectively, at addresses corresponding to transport order codes generated by order code counter means, said order code counter means generating a transport number upon detection of an article passing a respective one of said detectors.

6. A tracing apparatus as claimed in claim 4 or 5 wherein said comparing means comprises a comparator for successively comparing said second times at said first detector with said corresponding second times at said second detector.

7. A tracing apparatus as claimed in claim 6, wherein, when said data from said first and second memory means are not substantially different, said transport order codes generated by by said second order code generating means are successively applied to said articles passing by said second detector.

8. A tracing apparatus as claimed in claim 6, wherein said comparing means includes means for discriminating between transport errors of a first type wherein initially doubled articles are separated during transport and of a second type wherein an article has left the transport path during transport.

9. A tracing apparatus as claimed in claim 8, comprising means for correcting transport order codes by altering a transport number applied to an article passing said second detector in the event of a transport error of either said first or said second type, and in the case of errors of said first type, for applying reject codes to said separated articles.

* * * * *

UNITED STATES PATENT AND TRADEMARK OFFICE
CERTIFICATE OF CORRECTION

PATENT NO. : 4,499,372

DATED : February 12, 1985

INVENTOR(S) : Kazumi Nakano

It is certified that error appears in the above-identified patent and that said Letters Patent is hereby corrected as shown below:

Column 1, line 56, insert --varied-- after "is";

line 57, change "article" to --articles--;

change "a" to --the--.

Column 3, line 4, before "description", delete "The" and insert

--Before the--;

line 27, change "the" to --a--;

change "a" to --the--;

line 30, insert --(10 - 30m) after "15";

line 56, change "can not" to --cannot--.

UNITED STATES PATENT AND TRADEMARK OFFICE
CERTIFICATE OF CORRECTION

PATENT NO.  : 4,499,372

DATED       : February 12, 1985

INVENTOR(S) : Kazumi Nakano

It is certified that error appears in the above-identified patent and that said Letters Patent is hereby corrected as shown below:

Column 4, line 35, before "the" insert --during--;

line 36, after ""levels" delete ",".

Column 5, line 10, change "occuring" to --occurring--;

line 16, change "transportation" to --transport--;

line 17, before "error" delete "the";

line 17, after "way" insert --the--;

line 66, before "path 15" insert --transport--;

line 66 and 67, delete "transport".

Column 6, line 4, before "waveforms" delete "the";

line 8, delete "signal";

line 48, delete "at least";

line 49, insert --,-- after "$M_{26}$".

UNITED STATES PATENT AND TRADEMARK OFFICE
CERTIFICATE OF CORRECTION

PATENT NO. : 4,499,372

DATED : February 12, 1985

INVENTOR(S) : Kazumi Nakano

It is certified that error appears in the above-identified patent and that said Letters Patent is hereby corrected as shown below:

Column 7, line 4, delete "system";

line 5, delete "speed" and insert --system--.

Column 8, line 30, delete "any".

Column 10, line 17, delete "by"   (second occurrence).

Signed and Sealed this

Twenty-ninth Day of October 1985

[SEAL]

Attest:

*Attesting Officer*

DONALD J. QUIGG

*Commissioner of Patents and Trademarks—Designate*